United States Patent
Ette et al.

(10) Patent No.: US 10,186,151 B2
(45) Date of Patent: Jan. 22, 2019

(54) METHOD FOR FINDING AN OBJECT COUPLED TO A RADIO TRANSMITTER

(71) Applicant: VOLKSWAGEN AG, Wolfsburg (DE)

(72) Inventors: Bernd Ette, Wolfsburg (DE); Sebastian Jäckl, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/694,024

(22) Filed: Sep. 1, 2017

(65) Prior Publication Data

US 2018/0061233 A1 Mar. 1, 2018

(30) Foreign Application Priority Data

Sep. 1, 2016 (DE) .................. 10 2016 216 541

(51) Int. Cl.
*G08G 1/127* (2006.01)
*G08G 1/123* (2006.01)
*B60R 25/102* (2013.01)

(52) U.S. Cl.
CPC ............ *G08G 1/123* (2013.01); *B60R 25/102* (2013.01)

(58) Field of Classification Search
CPC .. G08G 1/205; G08G 1/017; G08G 1/096811; G08G 1/096844; G08G 1/142; G08G 1/123; B60R 25/102; B60R 25/33; G01S 5/0027; G06F 21/554; G06F 21/74; G06F 21/88; G06F 2221/2105; G06F 2221/2111; G06F 2221/2129; G06F 2221/2143; G06F 2221/2147;

(Continued)

(56) References Cited

U.S. PATENT DOCUMENTS 8,781,442 B1 * 7/2014 Link, II .................. G08G 1/205
455/411
2004/0098179 A1 * 5/2004 Sokoloski ............... B60R 25/00
701/31.4

(Continued)

FOREIGN PATENT DOCUMENTS

DE       102007011813 A1    9/2008
DE       102008061304 A1    7/2009

(Continued)

OTHER PUBLICATIONS

Search Report for German Patent Application No. 10 2016 216 541.0; dated Mar. 29, 2017.

*Primary Examiner* — Daniel Previl
(74) *Attorney, Agent, or Firm* — Barnes & Thornburg LLP

(57) ABSTRACT

A method for finding an object coupled to a radio transmitter, wherein the radio transmitter emits an assigned identifier. The method includes transmitting a first message to at least a first vehicle by a data processing system, wherein the message contains the information that a specific identifier is being searched for; forwarding the first message to at least a second vehicle by the first vehicle; receiving and comparing the assigned identifier with the specific identifier by a vehicle which received the first message; and, if the assigned identifier corresponds to the specific identifier, transmitting a second message by the vehicle which received the assigned identifier to the data processing system. The second message contains information that the specific identifier has been found and information about a position of the vehicle which received the assigned identifier.

21 Claims, 4 Drawing Sheets

(58) Field of Classification Search
CPC .. H04W 68/00; H04W 4/008; G01C 21/3667; G06Q 10/0833; G06Q 30/02; G06Q 30/0207; G06Q 40/12; G07B 15/00; G07B 15/063; G07C 5/008; H04L 12/2818; H04L 2012/2841; H04L 2012/285
USPC .............. 340/989, 990–994, 995.26, 995.27, 340/995.28, 996, 426.22, 426.2, 435
See application file for complete search history.

(56) References Cited

U.S. PATENT DOCUMENTS

2004/0167861 A1\* 8/2004 Hedley .............. G06Q 30/0283
705/400
2007/0008179 A1\* 1/2007 Hedley ................ G07B 15/06
340/928

FOREIGN PATENT DOCUMENTS

| GB | 2305216 A | 4/1997 | |
|---|---|---|---|
| WO | 2012072653 A1 | 6/2012 | |
| WO | 2014008752 A1 | 1/2014 | |
| WO | WO-2014008752 A1 \* | 1/2014 | ......... G06Q 10/0833 |

\* cited by examiner

METHOD FOR FINDING AN OBJECT COUPLED TO A RADIO TRANSMITTER

PRIORITY CLAIM

This patent application claims priority to German Patent Application No. 10 2016 216 541.0, filed 1 Sep. 2016, the disclosure of which is incorporated herein by reference in its entirety.

SUMMARY

Illustrative embodiments relate to the searching for and finding of objects. Illustrative embodiments further relate to methods for finding an object coupled to a radio transmitter.

BRIEF DESCRIPTION OF THE DRAWINGS

Exemplary embodiments are explained in more detail below with reference to the appended figures, of which.

DETAILED DESCRIPTION

Figure 1:
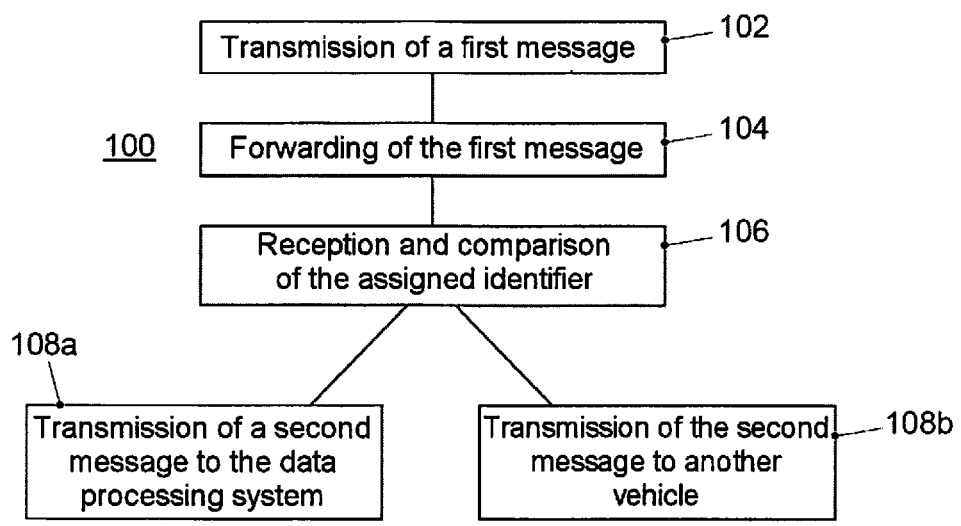
FIG. 1 shows a flowchart of an exemplary embodiment of a method for finding an object coupled to a radio transmitter.

A vehicle is a mobile mode of transportation for persons or goods. The vehicle may either be a passenger vehicle or a utility vehicle. For example, a vehicle can be a passenger motor vehicle, a truck, a motorbike or a tractor. Generally, a vehicle can be considered to be a device which comprises a motor, a drive train system and wheels.

In the case of a theft, vehicles which have a network connection can automatically sign on to a vehicle manufacturer, vehicle owner etc. Such an approach functions therefore only if the network connection and a location-determining device of the vehicle are intact. However, in the event of a theft it is to be expected as a usual event that the network connection will be deactivated (e.g., by shielding antennas of the vehicle). Therefore, it is often only possible to determine the last location of the vehicle, but not a route taken by the vehicle during its movement. A search for the vehicle is therefore possible only when there is a completely functioning transmission path.

Such solutions which are known as vehicle tracking systems are also not used in all vehicles owing to the, in some cases, high costs of such solutions. In addition, the installation of such systems is known to thieves and they can therefore tamper with it.

Therefore, there can be considered a need to improve the method of finding a vehicle or other types of objects.

Document DE 10 2007 011 813 A1 proposes a method for signaling a theft by vehicle-to-vehicle communication. In this context, in the case of a stolen vehicle, a signal which indicates the theft is generated and forwarded to another vehicle. However, document DE 10 2007 011 813 A1 cannot be found to contain a solution for initiating a search for the stolen vehicle.

Document WO 2014/008752 A1 proposes a method in which a status request is transmitted to a transponder of a monitored vehicle from a central node. If there is no response by the transponder within a specific time window, the status request is output to other vehicles for forwarding to the transponder. If the status request reaches the transponder, the latter transmits its status to the central node. However, the status of the transponder can be determined only if the status request actually reaches it. Document WO 2014/008752 A1 therefore cannot be found to contain a solution for determining the status of the transponder irrespective of the fact that the status inquiry reaches the transponder.

Document DE 10 2008 061 304 A1 proposes a method in which a theft message is emitted by infrastructure-to-vehicle communication or vehicle-to-vehicle communication. If the theft message is received by the stolen vehicle, the latter emits a message which identifies it. Document DE 10 2008 061 304 A1 therefore cannot be found to contain a solution for determining the status of the vehicle irrespective of the fact that the theft message reaches the vehicle.

There continues to be a requirement to improve the method of finding vehicles or other objects.

The disclosure makes this possible in a first embodiment of a method for finding an object which is coupled to a radio transmitter, wherein the radio transmitter emits an assigned identifier. The object may be any object, e.g., a vehicle, a piece of baggage, an electronic device or a piece of jewelry. The radio transmitter is coupled to this object. For example, the radio transmitter can be mounted on the outside or on the inside of the object. Alternatively, the radio transmitter can also be installed in the object—the radio transmitter can therefore be permanently installed in a vehicle or an electronic device. Alternatively, the radio transmitter can also be removably, mechanically coupled to the object. The identifier which is emitted by the radio transmitter is a feature which is linked to a specific identity and has the purpose of unambiguously identifying the object which carries it. The identifier can be composed of an individual sequence of characters or symbols which is assigned to the individual radio transmitter. In this way, the identity of the radio transmitter—and by virtue of the coupling also of the object—can be determined with certainty from the identifier. The radio transmitter can emit the identifier both continuously and only as a consequence of predetermined events. The emission of the identifier can occur both with a fixed frequency and with different frequencies.

The disclosed method firstly comprises transmission of a first message to at least a first vehicle by a data processing system, wherein the message contains the information that a specific identifier is being searched for. The data processing system may be a back-end of a vehicle manufacturer or other service provider which centrally coordinates the search for objects. With the transmission of the first message to the first vehicle a search for the object can be initiated. In addition, the disclosed method comprises forwarding of the first message to at least a second vehicle by the first vehicle. The forwarding of the first message to further vehicles can cause a network of vehicles to be built up which are sensitive to the specific identifier. By virtue of the movement of the vehicle it is possible to expand the searching area to a greater extent. The forwarding of the first message can be carried out by vehicle-to-vehicle communication.

The disclosed method also comprises reception and comparison of the assigned identifier with the specific identifier by a vehicle which has received the first message. One of the vehicles which has received the first message therefore carries out a comparison to determine whether the received assigned identifier is being searched for. The vehicles therefore serve as passive search elements which actively carry out comparison with the specific identifier only when the assigned identifier is received.

If the assigned identifier corresponds to the specific identifier, the disclosed method also comprises transmission of a second message by the vehicle which has received the assigned identifier to the data processing system. The second message contains the information that the specific identifier has been found, and information about a position of the vehicle which has received the assigned identifier. Therefore, feedback about the success of the search can be sent to the data processing system by the second message. The data which is contained in the second message can be forwarded to a vehicle owner, a security service or a security authority to recover the object. Since the position of the vehicle receiving the assigned identifier is used, the accuracy or reliability of the signaled position can additionally be increased since tampering with the position by theft of the object is ruled out. The position information can be determined by a location-determining device of the vehicle which has received the assigned identifier (e.g., by using a global navigation satellite system such as a Global Positioning System, GPS; GLObal NAvigation Satellite System, GLO-NASS; Galileo or Beidou).

Alternatively, the method can also comprise transmission of the second message by the vehicle which has received the assigned identifier to another vehicle which has received the first message, for forwarding to the data processing system. In this way, it can be made possible that even in the case of vehicles which do not have a direct connection to the data processing system (e.g., because they generally do not have any corresponding communication hardware or are moving in an area with poor connection quality), the second message is forwarded as quickly as possible to the data processing system.

The finding of objects can therefore be improved significantly with the disclosed method.

In some exemplary embodiments, the method also comprises, in the event of the second message being received by the other vehicle which has received the first message, generation of a third message which contains the second message and information about a position of the other vehicle, and transmission of the third message to the data processing system. The other vehicle therefore transmits, for the vehicle which has received the assigned identifier, the information about the finding of the object to the data processing system. As already indicated above, in this way it can be made possible that for vehicles which do not have a direct connection to the data processing system the second message is forwarded as quickly as possible to the data processing system. Alternatively, the disclosed method can also comprise transmission of the third message to yet another vehicle which has received the first message, for forwarding to the data processing system. Since the other vehicle also cannot have a direct connection to the data processing system, the repeated forwarding can make it possible for the information about the finding of the object to arrive at a vehicle which has a direct connection to the data processing system. In this context, other vehicles which have received the first message can in turn be used as relays.

According to a number of exemplary embodiments, the first message is transmitted to the first vehicle over a cellular network or over a wireless local network. Cellular networks are networks in which the last transmission path is wireless. Therefore, e.g., a mobile radio network. Mobile radio networks cover almost the entire surface of the earth, and the first message can therefore easily be transmitted to any other point on the earth. Vehicles also increasingly have the capability of receiving data from mobile radio networks and transmitting data via the networks. It is therefore possible for the first message easily to be transmitted from the data processing system to the first vehicle. Likewise, vehicles increasingly have the capability of communicating with wireless local networks (which are based on the IEEE 802.11 standard of the Institute of Electrical and Electronics Engineers, IEEE). Correspondingly, wireless local networks can also be used to transmit the first message to the first vehicle with little expenditure.

In a number of exemplary embodiments, the first message is forwarded wirelessly at a frequency of less than 500 MHz. This means that the transmission of the first message takes place from vehicle to vehicle at a transmission frequency of less than 500 MHz. Vehicles usually already have radio communication devices which operate at transmission frequencies of less than 500 MHz. For example, such radio communication devices are already present in the vehicle for its central locking system. In Europe, the radio communication devices operate at a frequency of 433 MHz, and in the USA at 315 MHz. Therefore, the transmission of the first message from vehicle to vehicle at a transmission frequency of less than 500 MHz permits radio communication devices which are already present in the vehicle to be used. Therefore, the installation of further radio communication devices in the vehicle can be avoided. The disclosed method can therefore also be implemented in already existing vehicles (e.g., by a software update). Alternatively, or additionally, the second message can also be transmitted to the other vehicle wirelessly at a frequency of less than 500 MHz. Therefore, recourse can be made to radio communication devices which are already present in the vehicle for the transmission of the second message. As a further alternative or additional option the wireless forwarding of the first message and/or the wireless transmission of the second message to the other vehicle can take place at a frequency between 902 MHz and 928 MHz. In some regions of the world, this ISM band (Industrial, Scientific and Medical Band) is used by radio communication devices which are already present in the vehicle, and it is therefore again possible to have recourse to radio communication devices which are already present in the vehicle, for the forwarding of the first or second message.

According to a number of exemplary embodiments, the first message is forwarded wirelessly according to the IEEE 802.15.1 transmission standard and/or the second message is transmitted to the other vehicle wirelessly according to the IEEE 802.15.1 transmission standard. The IEEE 802.15.1 transmission standard is also known by the term "BLUETOOTH®", which is supported by an increasing number of vehicles. It is therefore in turn possible to have recourse to radio communication devices which are already present in the vehicle.

In a number of exemplary embodiments, the first message is forwarded wirelessly with the bandwidth of at least 500 MHz or at least 20% of the arithmetic mean value of the lower and upper cutoff frequencies of a frequency band which is used and/or the second message is transmitted wirelessly with a bandwidth of at least 500 MHz or at least 20% of the arithmetic mean value of the lower and upper cutoff frequencies of a frequency band which is used to the further vehicle. The first message and/or the second message are therefore transmitted by ultra-wideband technology (UWB). Data can be transmitted with this at a very high rate over a short distance. In road traffic, vehicles move past one another at a short distance within a short time period. The transmission of data between the vehicles must therefore take place as quickly as possible. UWB is therefore suitable for transmitting data between vehicles owing to the high possible data rate.

According to a number of exemplary embodiments, the radio transmitter emits the assigned identifier only if a detection circuit which is coupled to the radio transmitter detects an unauthorized use of the object. The emission of the assigned identifier only as a consequence of an unauthorized use of the object can make it possible that the identifier is emitted only in situations in which the object is to be found again. The emission of the identifier during times at which the object is in the care of its user, can therefore be avoided. If the radio transmitter is supplied with energy by a battery or an accumulator, it is possible in this way to avoid unnecessary consumption of the limited energy supply. It is therefore possible on the other hand that, e.g., in the case of a theft sufficient energy is available for the emission of the assigned identifier. The detection circuit is a circuit which detects on the basis of the change in one or more mechanical or electrical parameters whether a use of the object is authorized or not. For example, the detection circuit can monitor the integrity of or damage to a mechanical connection between the radio transmitter and the object. Alternatively, the detection circuit can monitor one or more electrical signals of the object and trigger an alarm if one of the signals deviates from a normal range. Unnecessary emission of the assigned identifier by the radio transmitter can therefore be avoided.

In a number of exemplary embodiments, the object is a vehicle. Reliable finding of the vehicle can therefore be made possible.

According to a number of exemplary embodiments, the second message does not contain any further information which indicates an identity of the vehicle which has received the assigned identifier, with the exception of the position of this vehicle. It is therefore made possible for no information about the receiving car to be transmitted to the data processing system. Therefore, no conclusions can be drawn about uses of the vehicle on the basis of forwarded identifiers. A private sphere of a vehicle user can therefore be protected.

A further disclosed embodiment relates to a further method for finding an object which is coupled to a radio transmitter, wherein the radio transmitter emits an assigned identifier. The disclosed method again comprises transmission of a first message to at least a first vehicle by a data processing system, wherein the message contains the information that a specific identifier is being searched for. The disclosed method also comprises in turn forwarding of the first message to at least a second vehicle by the first vehicle, and reception and comparison of the assigned identifier with the specific identifier by a vehicle which has received the first message.

If the assigned identifier corresponds to the specific identifier, the disclosed method comprises transmission of a second message by the vehicle which has received the assigned identifier to another vehicle which has received the first message, for forwarding to the data processing system. The second message contains here the information that the specific identifier has been found, and information about a distance which the vehicle which has received the assigned identifier has traveled between the reception of the assigned identifier and the transmission of the second message. In contrast to the above method, information about the distance traveled between the reception of the assigned identifier and the transmission of the second message is therefore transmitted by the second message instead of the specific position of the vehicle.

The disclosed method can be used for vehicles which do not have an installed location-determining device. If the second message is received by another vehicle with an integrated location-determining device, the position or a probable location of the object can be determined from the position of the other vehicle and the information about the distance traveled. It is therefore also possible for vehicles which do not have an installed location-determining device to permit the object to be found.

In a number of exemplary embodiments, the method can also comprise, in the event of the second message being received by the other vehicle which has received the first message, generation of a third message which contains the second message and information about a position of the other vehicle. The method can in turn comprise transmission of the third message to the data processing system or transmission of the third message to yet another vehicle which has received the first message, for forwarding to the data processing system. As already indicated above, it can thus be made possible that for vehicles which do not have an installed location-determining device the second message is forwarded as quickly as possible with position information to the data processing system. If the other vehicle does not have a direct connection to the data processing system, the repeated forwarding can make it possible for the information about the finding of the object to arrive at a vehicle which has a direct connection to the data processing system. In this case, other vehicles which have received the first message can be used in turn as relays.

According to further exemplary embodiments, the method can have one or more of the other aforementioned method operations.

A further disclosed embodiment relates to a further method for finding an object which is coupled to a radio transmitter, wherein the radio transmitter emits an assigned identifier. The method comprises here transmission of a first message to at least a first vehicle by a data processing system, wherein the message contains an order to signal received identifiers. In contrast with the methods above, a search order for a specific identifier is not emitted but instead the vehicles are generally instructed to forward any received identifiers. Therefore, a plurality of objects can be searched for and found in an area independently of a specific identifier. It is therefore also possible for objects to be found for which a specific search request has not yet been transmitted by the data processing system or whose specific search request has not yet reached a vehicle.

The method also in turn comprises forwarding of the first message to at least a second vehicle by the first vehicle and reception of the assigned identifier by a vehicle which has received the first message.

Furthermore, the method comprises transmission of a second message by the vehicle which has received the assigned identifier to the data processing system, wherein the second message contains the information that the assigned identifier has been received, and information about a position of the vehicle which has received the assigned identifier. By the second message it is therefore possible for feedback about a successful search to be provided to the data processing system. The data which is contained in the second message can be forwarded to a vehicle owner, a security service or a security authority, to recover the object. Since the position of the vehicle receiving the assigned identifier is used, the accuracy or the reliability of the signaled position can also be improved, since tampering of the position by a theft of the object is ruled out.

Alternatively, the method can also comprise transmission of the second message by the vehicle which has received the assigned identifier to another vehicle which has received the first message, for forwarding to the data processing system. In this way it can be made possible that even vehicles which do not have a direct connection to the data processing system (e.g., because they do not have corresponding communication hardware or are moving in an area with poor connection quality) forward the second message as quickly as possible to the data processing system.

With the disclosed method, it is therefore possible to substantially improve the finding of objects.

In a number of exemplary embodiments, the method can therefore also comprise, in the event of the second message being received by the further vehicle which has received the first message, generation of a third message which contains the second message and information about a position of the other vehicle. Furthermore, the method can comprise transmission of the third message to the data processing system or transmission of the third message to yet another vehicle which has received the first message, for forwarding to the data processing system. As already indicated above, it can therefore be made possible that for vehicles which do not have an installed location-determining device the second message is forwarded as quickly as possible with position information to the data processing system. If the other vehicle does not have a direct connection to the data processing system, the forwarding can make it possible for the information about the finding of the object to arrive at a vehicle which has a direct connection to the data processing system. In this case, further vehicles which have received the first message can in turn be used as relays.

According to further exemplary embodiments, the method can have one or more of the other abovementioned method operations.

Yet another disclosed embodiment relates to a further method for finding an object which is coupled to a radio transmitter, wherein the radio transmitter emits an assigned identifier. The method comprises here in turn transmission of a first message to at least a first vehicle by a data processing system, wherein the message contains an order to signal received identifiers. The method in turn comprises forwarding the first message to at least a second vehicle by the first vehicle and reception of the assigned identifier by a vehicle which has received the first message.

The method also comprises transmission of a second message by the vehicle which has received the assigned identifier to a further vehicle which has received the first message, for forwarding to the data processing system. The second message contains here the information that the assigned identifier has been received, and information about a distance which the vehicle which has received the assigned identifier has traveled between the reception of the assigned identifier and the transmission of the second message.

By the second message it is therefore possible for feedback about a successful search to be provided. The disclosed method can be used here for vehicles which do not have an installed location-determining device. If the second message is received by another vehicle with an integrated location-determining device, the position or a probable location of the object can be determined from the position of the other vehicle and the information about the distance traveled. This information can be forwarded to a vehicle owner, a security service or a security authority, to recover the object. It is therefore also possible for vehicles which do not have an installed location-determining device to permit the finding of the object.

In a number of exemplary embodiments, the method can also comprise, in the event of the second message being received by the other vehicle which has received the first message, generation of a third message which contains the second message and information about a position of the other vehicle. The method can in turn comprise transmission of the third message to the data processing system or transmission of the third message to yet another vehicle which has received the first message, for forwarding to the data processing system. As already indicated above, it can thus be made possible that for vehicles which do not have an installed location-determining device the second message is forwarded as quickly as possible with position information to the data processing system. If the other vehicle does not have a direct connection to the data processing system, the forwarding can make it possible for the information about the finding of the object to arrive at a vehicle which has a direct connection to the data processing system. In this case, other vehicles which have received the first message can be used in turn as relays.

According to further exemplary embodiments, the method can have one or more of the other aforementioned method operations.

FIG. 1 shows a method 100 for finding an object coupled to a radio transmitter. In this context, the radio transmitter emits an assigned identifier. The method 100 comprises transmission 102 of a first message to at least a first vehicle by a data processing system, wherein the message contains the information that a specific identifier is being searched for. Furthermore, the method 100 comprises forwarding 104 of the first message to at least a second vehicle by the first vehicle. The method 100 also comprises reception and comparison 106 of the assigned identifier with the specific identifier by a vehicle which has received the first message.

If the assigned identifier corresponds to the specific identifier, the method 100 comprises transmission 108a of a second message by the vehicle which has received the assigned identifier to the data processing system. The second message contains here the information that the specific identifier has been found, and information about a position of the vehicle which has received the assigned identifier. Alternatively, the method 100 comprises transmission 108b of the second message by the vehicle which has received the assigned identifier to another vehicle which has received the first message, for forwarding to the data processing system.

Feedback about the successful search can therefore be provided to the data processing system by the second message. The data contained in the second message can be forwarded to a vehicle owner, a security service or a security authority, to recover the object. It can also be made possible that for vehicles which do not have a direct connection to the data processing system the second message is forwarded as quickly as possible to the data processing system. The finding of objects can therefore be significantly improved with the method 100.

Further details of the method are described above in conjunction with one or more exemplary embodiments. The method can comprise one or more optional features according to one or more of the exemplary embodiments described above.

Figure 2:
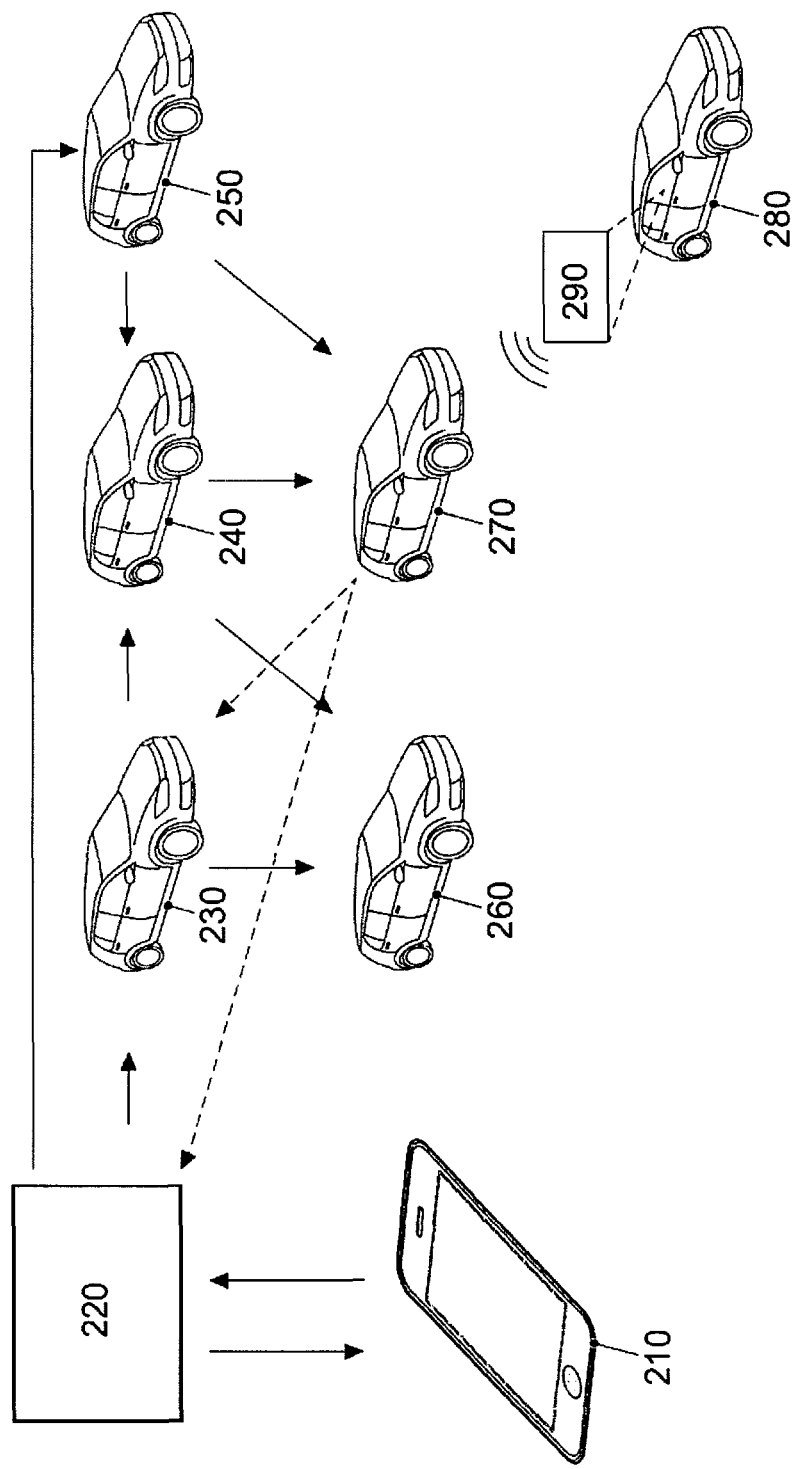
FIG. 2 shows a schematic view of an exemplary message flow for the method shown in FIG. 1.

An exemplary message flow for the method 100 shown in FIG. 1 is shown in FIG. 2. For example, a search request for a specific object can be transmitted to a data processing system (back-end) 220, e.g., of a vehicle manufacturer or of a service provider, by a mobile communication device 210 (e.g., smartphone, tablet computer or laptop) or a stationary computer (not shown). In the example illustrated in FIG. 2, the vehicle 280 is searched for, the vehicle 280 being coupled to a radio transmitter 290. The radio transmitter 290 can be fixedly installed in the vehicle 280 or alternatively can also be detachable from the vehicle 290 (e.g., as a security dongle). If a detection circuit (not shown) which is coupled to the radio transmitter 290 detects an unauthorized use of the vehicle 290, the radio transmitter emits an identifier which is assigned to the radio transmitter. In other words, the security dongle is activated in the case of misuse of the vehicle and immediately pings until its battery is dead.

Owing to the search request, the data processing system 220 emits a first message to at least a first vehicle. In FIG. 2, the first message is transmitted to the vehicle 230 and to the vehicle 250. The message contains here the information that a specific identifier is being searched for—specifically that of the radio transmitter 290. The first message can be transmitted via a cellular network or via a wireless local network.

The first message is forwarded to other vehicles. As indicated in FIG. 2, the vehicle 230 can forward the first message when traveling past the vehicle 240 or the vehicle 260. The vehicle 250 can forward the first message to the vehicle 240 or the vehicle 270. The vehicle 240 which has received the first message from another vehicle can also forward the first message to other vehicles, e.g., to the vehicle 260 or to the vehicle 270. In this way, a network of searching vehicles can be generated which can cover a large search area owing to their mobility.

If the assigned identifier is then received by a vehicle which has received the first message, e.g., by the vehicle 270, the latter compares the assigned identifier with the specific identifier contained in the first message.

If the assigned identifier corresponds to the specific identifier, the vehicle 270 transmits a second message either to the data processing system 220 or to another vehicle which has received the first message, e.g., the vehicle 230 here—as indicated by the dashed arrows. The second message contains here the information that the specific identifier has been found, and information about a position of the vehicle 270 which has received the assigned identifier.

In this way, direct feedback about the successful search can be provided to the data processing system 220 by the second message. It can also be made possible that if the vehicle 270 does not have a direct connection to the data processing system 220 (because it does not have any direct communication method for cellular communication or is located in an area with poor reception) the second message is forwarded to the data processing system 220 via the other vehicle 230.

The data contained in the second message can be transferred to the requesting mobile communication device 210 by the data processing system 220, with the result that a vehicle owner can track the location of the lost vehicle 280 and, if appropriate, pick up the vehicle there or inform a security authority.

Although the finding of the vehicle 280 has been described by way of example in FIG. 2, it goes without saying that any object which is coupled to a radio transmitter can be found with the described method.

Figure 3:
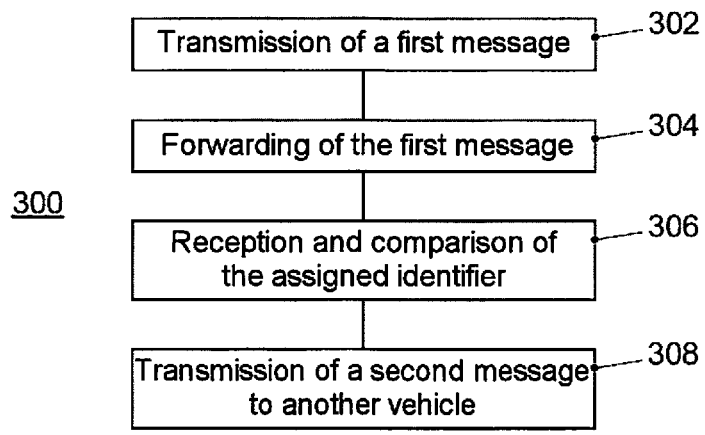
FIG. 3 shows a flowchart of a further exemplary embodiment of a method for finding an object coupled to a radio transmitter.

FIG. 3 shows another method 300 for finding an object which is coupled to a radio transmitter. The radio transmitter emits an assigned identifier here. The method 300 comprises transmission 302 of a first message to at least a first vehicle by a data processing system. The message contains here the information that a specific identifier is being searched for. In addition, the method 300 comprises forwarding 304 of the first message to at least a second vehicle by the first vehicle. The method 300 also comprises reception and comparison 306 of the assigned identifier with the specific identifier by a vehicle which has received the first message.

If the assigned identifier corresponds to the specific identifier, the method 300 comprises transmission 308 of a second message by the vehicle which has received the assigned identifier to a further vehicle which has received the first message, for forwarding to the data processing system. The second message contains here the information that the specific identifier has been found, and information about a distance which the vehicle which has received the assigned identifier has traveled between the reception of the assigned identifier and the transmission of the second message.

The method 300 can be used for vehicles which do not have an installed location-determining device. If the second message is received by another vehicle with an integrated location-determining device, the position or a probable location of the object can be determined from the position of the other vehicle and the information about the distance traveled. It is therefore also possible for vehicles which do not have an installed location-determining device to permit the object to be found.

Further details of the method are described above in relation to one or more exemplary embodiments. The method can comprise one or more optional features according to one or more of the exemplary embodiments described above.

Figure 4:
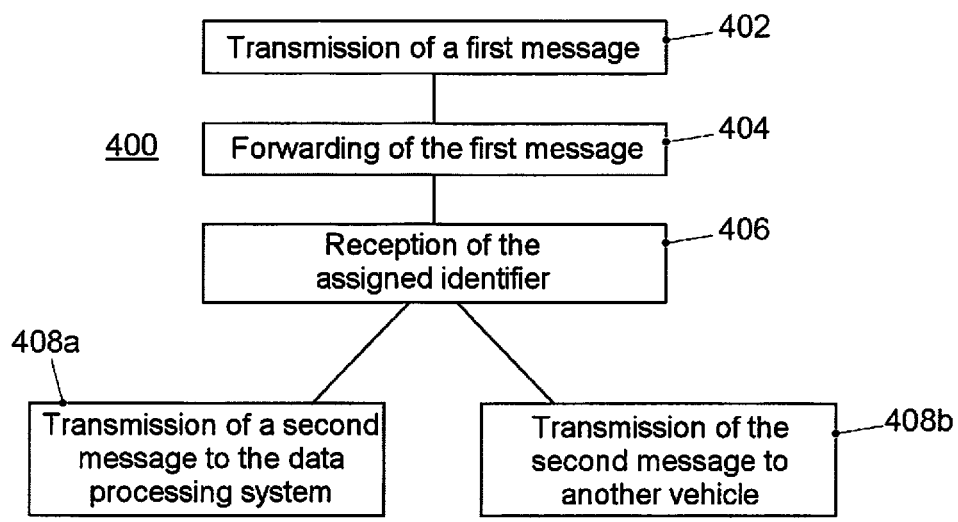
FIG. 4 shows a flowchart of yet another exemplary embodiment of a method for finding an object coupled to a radio transmitter.

Yet another method 400 for finding an object coupled to a radio transmitter is shown in FIG. 4. In this context, the radio transmitter again emits an assigned identifier. The method 400 comprises transmission 402 of a first message to at least a first vehicle by a data processing system, wherein the message contains an order to signal received identifiers. In addition, the method 400 comprises forwarding 404 of the first message to at least a second vehicle by the first vehicle. The method 400 also comprises reception 406 of the assigned identifier by a vehicle which has received the first message.

The method 400 also comprises transmission 408a of a second message by the vehicle which has received the assigned identifier to the data processing system. The second message contains here the information that the assigned identifier has been received, and information about a position of the vehicle which has received the assigned identifier. Alternatively, the method 400 comprises transmission 408b of the second message by the vehicle which has received the assigned identifier to a further vehicle which has received the first message, for forwarding to the data processing system.

In this way, feedback about a successful search can be provided to the data processing system by the second message. The data contained in the second message can be forwarded to a vehicle owner, a security service or a security authority, to recover the object. It can also be made possible that vehicles which do not have a direct connection to the data processing system can forward the second message as quickly as possible to the data processing system. The finding of objects can therefore be significantly improved with the method 400.

Further details of the method are described above in relation to one or more exemplary embodiments. The method can comprise one or more optional features according to one or more of the exemplary embodiments described above.

Figure 5:
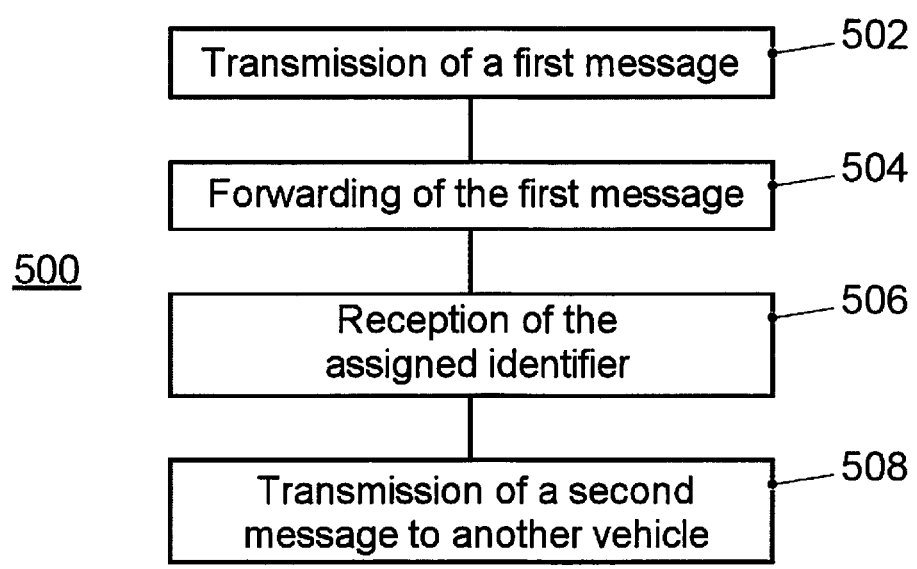
FIG. 5 shows a flowchart of yet another exemplary embodiment of a method for finding an object coupled to a radio transmitter.

FIG. 5 shows a further method 500 for finding an object coupled to a radio transmitter. In this context, the radio transmitter in turn emits an assigned identifier. The method 500 comprises here transmission 502 of a first message to at least a first vehicle by a data processing system, wherein the message contains an order to signal received identifiers. In addition, the method 500 comprises forwarding 504 of the first message to at least a second vehicle by the first vehicle. The method 500 also comprises reception 506 of the assigned identifier by a vehicle which has received the first message.

Furthermore, the method 500 comprises transmission 508 of a second message by the vehicle which has received the assigned identifier to another vehicle which has received the first message, for forwarding to the data processing system. In this context, the second message contains the information that the assigned identifier has been received, and information about a distance which the vehicle which has received the assigned identifier has traveled between the reception of the assigned identifier and the transmission of the second message.

In this way, feedback about a successful search can be provided by the second message. The method 500 can be used here for vehicles which do not have an installed location-determining device. If the second message is received by another vehicle with an integrated location-determining device, the position or a probable location of the object can be determined from the position of the other vehicle and the information about the distance traveled. This information can be forwarded to a vehicle owner, a security service or a security authority, to recover the object. It is therefore also possible to make it possible for vehicles which do not have an installed location-determining device to find the object.

Further details of the method are described above in relation to one or more exemplary embodiments. The method can comprise one or more optional features according to one or more of the exemplary embodiments described above.

LIST OF REFERENCE NUMBERS

100 Method for finding an object coupled to a radio transmitter
102 Transmission of a first message
104 Forwarding of the first message
106 Reception and comparison of the assigned identifier
108*a* Transmission of a second message to the data processing system
108*b* Transmission of the second message to another vehicle
210 Mobile communication device
220 Data processing system
230 Vehicle
240 Vehicle
250 Vehicle
260 Vehicle
270 Vehicle
280 Vehicle
290 Radio transmitter
300 Method for finding an object coupled to a radio transmitter
302 Transmission of a first message
304 Forwarding of the first message
306 Reception and comparison of the assigned identifier
308 Transmission of a second message to another vehicle
400 Method for finding an object coupled to a radio transmitter
402 Transmission of a first message
404 Forwarding of the first message
406 Reception of the assigned identifier
408*a* Transmission of a second message to the data processing system
408*b* Transmission of the second message to another vehicle
500 Method for finding an object coupled to a radio transmitter
502 Transmission of a first message
504 Forwarding of the first message
506 Reception of the assigned identifier
508 Transmission of a second message to a further vehicle

The invention claimed is:

1. A method for locating a target transportation vehicle coupled to a radio transmitter, wherein the radio transmitter emits an assigned identifier associated with the target transportation vehicle, the method comprising:
   transmitting a first message to at least a first transportation vehicle by a data processing system, wherein the first message contains information that a specific identifier is being searched for;
   forwarding the first message to at least a second transportation vehicle by the first transportation vehicle;
   receiving and comparing the first message with the receiving vehicle's identifier, the receiving vehicle being any one of the first, second, or target transportation vehicles; and
   in response to the receiving vehicle's identifier corresponding to the specific identifier such that the target vehicle has been located:
      transmitting a second message by the target transportation vehicle to the data processing system; or
      transmitting the second message by the target transportation vehicle to one or more of the first, second, or another transportation vehicle for forwarding to the data processing system,
   wherein the second message contains information indicating that the specific identifier has been found and information indicating the location of the target transportation vehicle and/or information about a distance which the target transportation vehicle has traveled between reception of the first message and transmission of the second message.

2. The method of claim 1, further comprising:
   in response to receipt of the second message by the other transportation vehicle which received the first message:
   generating a third message that contains the second message and information about a location of the other transportation vehicle; and one of:
      transmitting the third message to the data processing system; or
      transmitting the third message to another transportation vehicle which received the first message, for forwarding to the data processing system.

3. The method of claim 1, wherein the first message is transmitted over a cellular network or over a wireless local network.

4. The method of claim 1, wherein the first message is forwarded wirelessly at a frequency of less than 500 MHz, and/or wherein the second message is transmitted to the other vehicle wirelessly at a frequency of less than 500 MHz.

5. The method of claim 1, wherein the radio transmitter emits the assigned identifier only in response to a detection circuit coupled to the radio transmitter detecting an unauthorized use of the target transportation vehicle.

6. The method of claim 1, wherein the second message contains only a position of one the transportation vehicles which received the assigned identifier without further identification of that transportation vehicle.

7. The method of claim 1, further comprising transmitting a search request to the data processing system by a mobile device.

8. A method for locating a target transportation vehicle coupled to a radio transmitter, wherein the radio transmitter emits an assigned identifier linked with the target transportation vehicle, the method comprising:
   transmitting a first message to at least a first transportation vehicle by a data processing system, wherein the first message contains an order to signal a received identifier;
   forwarding the first message to at least a second transportation vehicle by the first transportation vehicle;
   receiving and comparing the received identifier ordered in the first message by the first, second, or another transportation vehicle which received the first message with the receiving vehicle's assigned identifier; and
   in response to the receiving vehicle's assigned identifier corresponding to the received identifier ordered in the first message, transmitting a second message indicating that the assigned identifier linked with the target transportation vehicle has been located:
      to the data processing system by the receiving vehicle as the target transportation vehicle; or to any other transportation vehicle for forwarding to the data processing system,
   wherein the second message contains the information that the assigned identifier linked with the target transportation vehicle has been located, and information about a location of the target transportation vehicle and/or information about a distance which the target transportation vehicle has traveled between the reception of the first message and the transmission of the second message.

9. The method of claim 8, further comprising:
   in response to receipt of the second message by the other transportation vehicle which received the first message:
   generating a third message that contains the second message and information about a location of the other transportation vehicle; and one of:
      transmitting the third message to the data processing system; or
      transmitting the third message to another transportation vehicle which received the first message, for forwarding to the data processing system.

10. The method of claim 8, wherein the first message is transmitted over a cellular network or over a wireless local network.

11. The method of claim 8, wherein the first message is forwarded wirelessly at a frequency of less than 500 MHz, and/or wherein the second message is transmitted to the other vehicle wirelessly at a frequency of less than 500 MHz.

12. The method of claim 8, wherein the radio transmitter emits the assigned identifier only in response to a detection circuit coupled to the radio transmitter detecting an unauthorized use of the target transportation vehicle.

13. The method of claim 8, wherein the second message contains only a position of one the transportation vehicles which received the assigned identifier without further identification of that transportation vehicle.

14. The method of claim 8, further comprising transmitting a search request to the data processing system by a mobile device.

15. A method for finding a target transportation vehicle coupled to a radio transmitter, the method comprising:
   receiving a first message from a data processing system, wherein the first message contains information that a specific identifier is being searched for;
   forwarding the first message to at least a second transportation vehicle;
   receiving the first message from a radio transmitter coupled to a transportation vehicle, wherein the specific identifier contained by the first message is an identifier assigned to the radio transmitter of the target transportation vehicle being searched for by the data processing system;
   comparing the specific identifier contained by the first message with the receiving vehicle's identifier; and
   in response to the receiving vehicle's identifier corresponding to the specific identifier identified in the first message:
      transmitting a second message to the data processing system; or
      transmitting a second message to another vehicle for forwarding to the data processing system,
   wherein the second message contains information that the specific identifier has been located, and information about a location of the target transportation vehicle and/or information about a distance which the target transportation vehicle has traveled between the reception of the first message and the transmission of the second message.

16. The method of claim 15, further comprising:
   in response to receipt of the second message by the other transportation vehicle which received the first message:
   generating a third message that contains the second message and information about a location of the other transportation vehicle; and one of:
      transmitting the third message to the data processing system; or
      transmitting the third message to another transportation vehicle which received the first message, for forwarding to the data processing system.

17. The method of claim 15, wherein the first message is transmitted over a cellular network or over a wireless local network.

18. The method of claim 15, wherein the first message is forwarded wirelessly at a frequency of less than 500 MHz, and/or wherein the second message is transmitted to the other vehicle wirelessly at a frequency of less than 500 MHz.

19. The method of claim 15, wherein the radio transmitter emits the assigned identifier only in response to a detection circuit coupled to the radio transmitter detecting an unauthorized use of the target transportation vehicle.

20. The method of claim 15, wherein the second message contains only a position of one the transportation vehicles which received the assigned identifier without further identification of that transportation vehicle.

21. The method of claim 15, further comprising transmitting a search request to the data processing system by a mobile device.

\* \* \* \* \*